D. M. SMALL.
GAS BURNER GAGE.
No. 266,540. Patented Oct. 24, 1882.
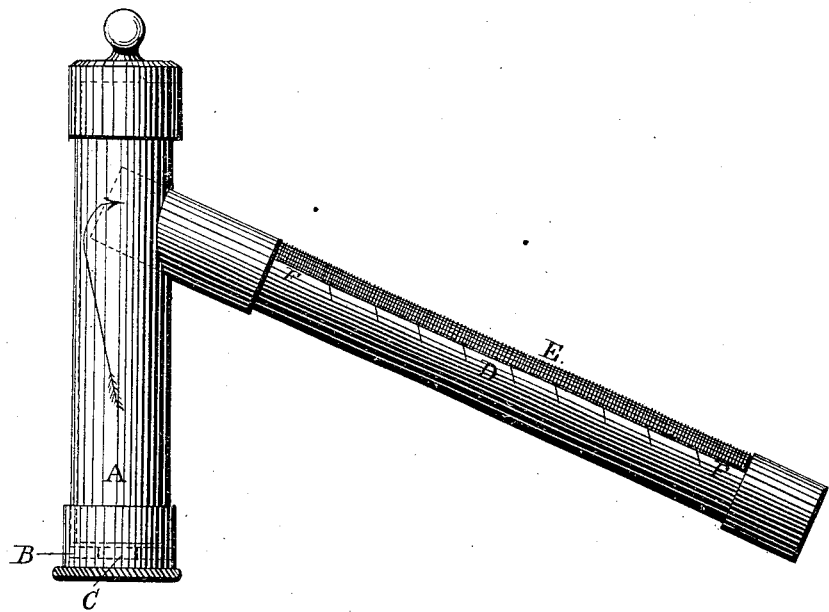
WITNESSES
Jos H. Perkins
Charles F. Riley
INVENTOR
Dexter M. Small

United States Patent Office.

DEXTER M. SMALL, OF PROVIDENCE, RHODE ISLAND.

GAS-BURNER GAGE.

SPECIFICATION forming part of Letters Patent No. 266,540, dated October 24, 1882.

Application filed February 12, 1880.

*To all whom it may concern:*

Be it known that I, DEXTER M. SMALL, of Providence, in the State of Rhode Island, have invented a new and useful Improvement in Gas-Burner Gages, as follows:

The accompanying drawing, which forms a part of this specification, gives a general view of my original gage, patented September 24, 1878, together with the improvement herein set forth.

A represents the base of the gage, which is hollow, with a rubber gasket, B, in the bottom, and with an opening near the top leading into the tube D or for the tube D to enter. To test the rate at which gas is passing through a burner, the top of the burner is pressed up into the base A through the aperture C in the rubber gasket B, so that the gas must pass through the base A in the line of the arrow into the tube D and out at the slot E, where it is lighted, the rate of passage being ascertained by the size or length of the blaze in connection with the graduated scale F F, made for the purpose. When in use the base A of the instrument is held in a perpendicular position, the tube D being made at an angle of thirty-five degrees, or at any other desired angle with it. The scale F F is marked on the side of the tube D, as seen in the drawing, or elsewhere, so that it can be conveniently seen in connection with the blaze.

Now, for various reasons it has been found exceedingly difficult to distinguish the extreme point of the blaze at the slot E, which is necessary in order to ascertain with accuracy the rate of consumption. This difficulty I have overcome by a simple device which both steadies the blaze and renders it distinct to its extremest point—viz., by combining wire-gauze with the slot E, as seen in the drawing. It can be placed either on the inside or outside of the tube D, so that it completely covers the slot, and, instead of wire-gauze, perforated tin, brass, or any similar equivalent could be used, or the tube itself be perforated and the slot dispensed with. This device both steadies the blaze, by equalizing the flow of the gas, and renders the extreme point of it more easily discernible by bringing the commencement of combustion near the slot or tube.

A better result than by the original gage can be obtained by using, in connection with the slot E, whether the wire-gauze or its equivalent be used or not, a chimney made of any suitable material a little wider and longer than the slot, so as not to interfere with the blaze, and high enough to make a steady draft, with the bottom of it about one-fourth of an inch above the slot, so the blaze can be seen beneath it. If this chimney be made of perforated material, the blaze can be distinctly seen through the perforations.

A scale attached to the side of the tube D and extending up a little above the slot E on a line with it, so the blaze can be seen at a point above the tube or slot, is also an advantage, whether the gauze, &c., be used or not. It is better to leave a passage for air between the scale and the tube, or to have the scale made of open-work for the same purpose.

I claim as my invention—

In a gas-gage in which the rate of flow or passage of the gas through the instrument is ascertained by measuring the flame produced thereby, the combination, with a graduated scale, of a series of small apertures, openings, or perforations for the gas to pass through, and at which to ignite it and measure the flame, substantially as described, and for the purpose set forth.

DEXTER M. SMALL.

Witnesses:
JOS. H. PERKINS,
CHARLES F. RILEY.